March 12, 1929.   W. L. LUECK   1,704,863
STEERING GEAR
Filed May 8, 1928   2 Sheets-Sheet 2
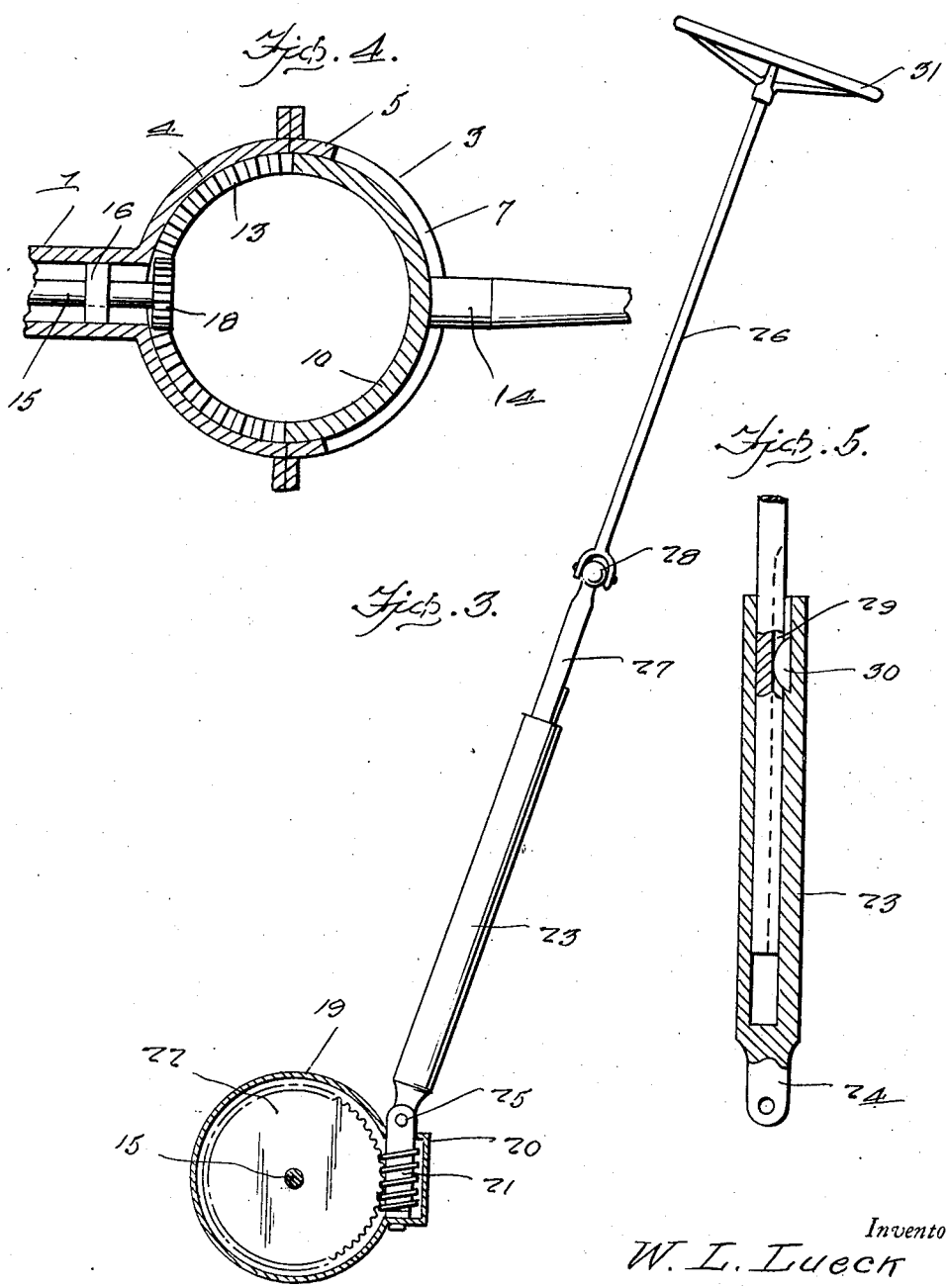

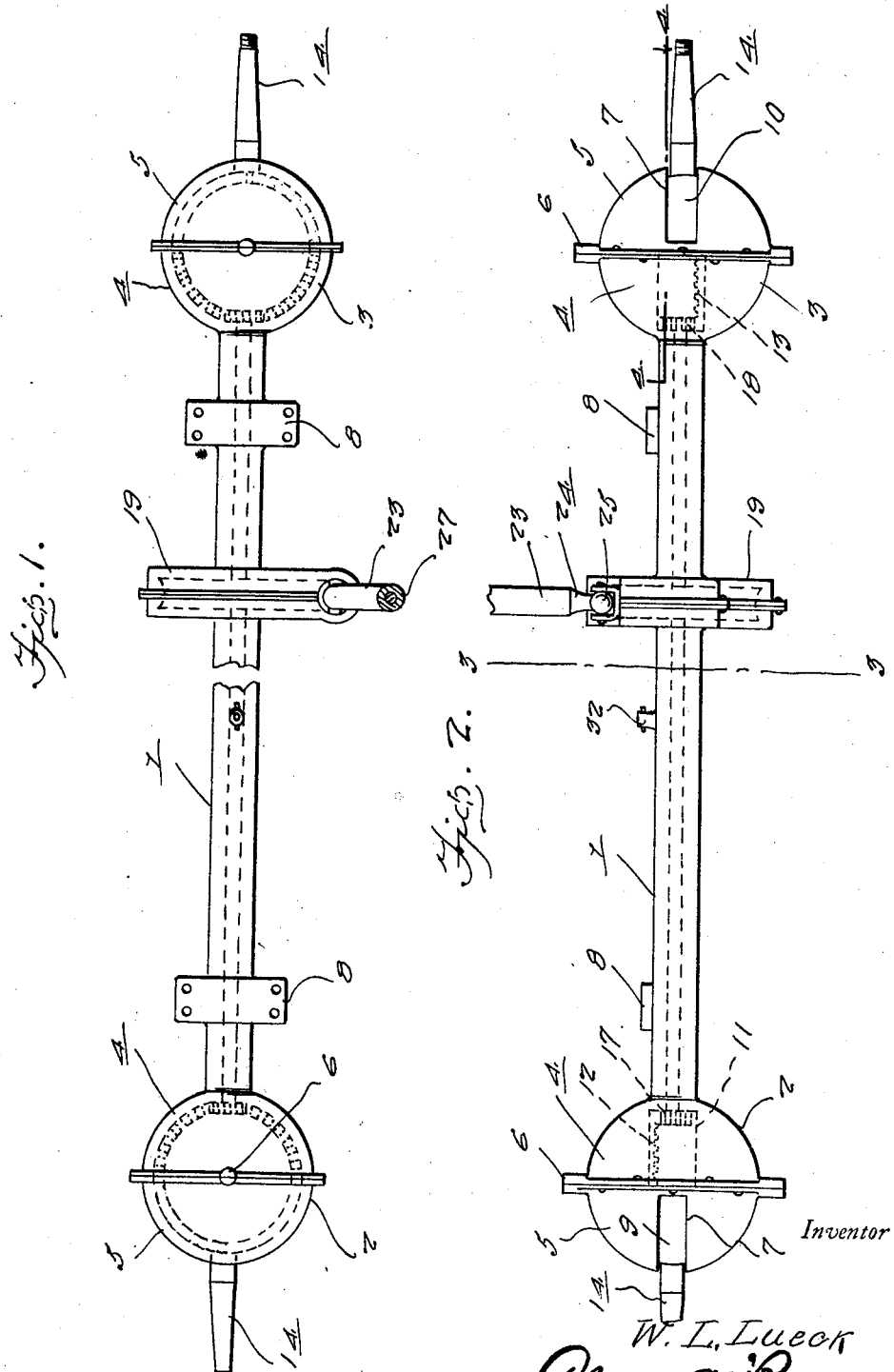

Patented Mar. 12, 1929.

1,704,863

UNITED STATES PATENT OFFICE.

WALTER L. LUECK, OF CLINTONVILLE, WISCONSIN.

STEERING GEAR.

Application filed May 8, 1928. Serial No. 276,120.

The present invention relates to improvements in steering gears for motor vehicles and has for its principal object to provide a simplified structure for the wheels of a motor vehicle, whereby the same may be steered by the occupant of the vehicle in a positive and efficient manner.

One of the important objects of the present invention is to provide a steering gear wherein all of the parts may be lubricated from a single point, thus saving considerable time and labor.

A still further object of the invention is to provide a steering gear of the above mentioned character which is simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and in which like numerals designate like parts throughout the several views:

Figure 1 is a top plan view of the steering gear, the steering column broken away.

Figure 2 is a side elevation with a portion of the steering column broken away.

Figure 3 is a sectional view, taken approximately on the line 3—3 of Figure 2, the steering column being shown in elevation.

Figure 4 is a sectional view, taken on the line 4—4 of Figure 2, and

Figure 5 is a sectional view through the tubular lower section of the steering column showing the manner in which the slidable lower rod section of the steering post is arranged therein.

In the drawings, wherein for the purpose of illustration is shown the preferred embodiment of my invention, the numeral 1 designates a hollow front axle and arranged on the respective ends of the hollow axle are the hollow spherical heads 2 and 3. Each of these heads includes a pair of complementary semi-spherical sections indicated by the numerals 4 and 5 respectively and the inner opposed edges of these sections are formed with abutting flanges that are secured together by any appropriate fastening means. In addition, trunnions 6 are formed on each spherical head at diametrically opposite points for the purpose of carrying the ends of the axis on which the inner hollow spherical members hereinafter to be more fully described are mounted. The outer section 5 of each hollow spherical head is formed with a horizontally extending slot 7, as is clearly shown in Figures 2 and 4 of the drawings, and the purpose of this slot will be presently described.

A pair of spring supporting plates 8 are arranged on the top portion of the hollow axle 1, inwardly of the respective hollow spherical heads for supporting the front springs of the motor vehicle.

Arranged for rotation on a vertical axis in the hollow spherical head 2, is the smaller hollow spherical member 9, a similar member 10 being adapted for disposition in the hollow spherical head 3 at the opposite end of a hollow axle 1. Each inner hollow spherical head or member is formed with a horizontally disposed slot 11, which extends for substantially one half of the circumference of each spherical member, and as is clearly shown in Figure 2, the upper side edge of the slot that is formed in the spherical member 9, is provided with the gear teeth 12, while the lower longitudinal side of the slot, formed in the other inner spherical member has similar gear teeth 13, formed therein, for a purpose to be presently described in detail.

A stub axle 14 is secured to each hollow spherical member that is disposed within the stationary hollow spherical head, and these stub axles extend through the slots 7 and are operable in said slots simultaneously with the movement of the steering wheels that are adapted to be mounted on the outer ends of the stub axles in the usual manner.

Journaled for rotation within the hollow axle 1, is the elongated drive shaft 15, a bearing 16 being arranged within the hollow axle adjacent each stationary spherical head for the respective ends of the drive shaft, and as is clearly illustrated in Figure 4, the hollow axle has communication with the stationary spherical head arranged on each end thereof and each end of the drive shaft extends into the slot formed in the respective rotatable inner spherical head member. A pinion 17 is secured on one end of the drive shaft for meshing engagement with the gear teeth 12, associated with the spherical head member 9 arranged in the stationary spherical head 2. A similar pinion 18 is secured on the other end of the drive shaft for meshing engagement with the gear teeth 13, of the other rotatable inner spherical member arranged in the stationary spherical head 3, as is shown in detail in Figure 4.

The operating means for the drive shaft 15 will now be specifically described. A worm wheel housing 19 is arranged on the intermediate portion of the hollow axle 1 and this housing is provided with an auxiliary housing 20, in which is arranged the worm 21, the ends of the worm projecting through the top and bottom portions of the auxiliary housing and this worm meshes with a worm wheel 22, secured on the drive shaft 15 and disposed within the worm housing 19. It is of course, understood that the worm housing is composed of separable sections that are secured together as is indicated in the drawings.

Manifestly, the hollow axle 1 will be composed of sections, the inner opposed ends of the sections having the complementary sections of a worm housing arranged thereon and when the sections of the worm housing are secured together, a unitary structure will be provided.

The steering column forming a part of the present invention includes a lower tubular member 23 that is closed at its lower end and is formed at its lower end with an extension 24 that is operatively connected to the upper end of the worm 20 as at 25.

The steering post includes the complementary upper and lower rod sections 26 and 27 respectively that are connected together at their adjacent ends by the coupling designated generally by the numeral 28. The lower rod section 27 is slidably disposed in the cylindrical member 23, and for the purpose of preventing rotation of the rod section 27 within the cylinder 23, I provide a longitudinally extending slot 29 in the rod section and cooperating with this slot is the key 30 arranged in the upper end portion of the cylindrical member 23, as shown more clearly in Figure 5. A steering wheel 31 is secured on the upper end of the upper rod section 26, and by providing a vertically movable steering post, the same will compensate for any vertical movement of the hollow axle, incident to the vehicle with which the present steering gear is associated travelling over a rough and uneven road surface.

The operation of the steering gear is thought to be readily obvious from the construction shown and described, and therefore a detailed description of the same is believed unnecessary.

The tubular axle 1 is formed with a grease cup 32, at its intermediate portion, whereby a lubricant may be supplied to the hollow axle and the various parts will be lubricated from this one point, thus saving considerable time and labor. Furthermore, the parts of the steering gear embodying my invention are so arranged as to permit the proper lubrication thereof. The simplicity of my improved steering gear renders the same very easy to operate and furthermore can be constructed at a very low cost and yet be strong and durable.

While I have shown the preferred embodiment of my invention, it is to be understood that various changes in the size, shape and arrangement of parts may be resorted to, without departing from the spirit of the invention or the scope of the appended claims.

Having thus described my invention, what I claim as new is:

1. A steering gear for motor vehicles comprising in combination, a hollow axle, stationary hollow spherical heads arranged on the respective ends of the hollow axle, each head being formed with a horizontally disposed slot in its outer side, a hollow spherical member arranged for rotation on a vertical axis in each hollow spherical stationary head, a stub axle extending from the outer side of each rotatable spherical member through the slot in the respective stationary head, the inner side of each rotatable member being formed with a horizontal slot, gear teeth formed in one of the side edges of each slot, a drive shaft extending through the hollow axle, the ends of the shaft extending into the slots of the respective rotatable members, a pinion on each end of the drive shaft for meshing engagement with the gear teeth, a steering post, and means operatively connecting the steering post with the shaft in the hollow axle for driving the same.

2. A steering gear for motor vehicles comprising in combination, a hollow axle, stationary hollow spherical heads arranged on the respective ends of the hollow axle, each head being formed with a horizontally disposed slot in its outer side, a hollow spherical member arranged for rotation on a vertical axis in each hollow spherical stationary head, a stub axle extending from the outer side of each rotatable spherical member through the slot in the respective stationary head, the inner side of each rotatable member being formed with a horizontal slot, gear teeth formed in one of the side edges of each slot, a drive shaft extending through the hollow axle, the ends of the shaft extending into the slots of the respective rotatable members, a pinion on each end of the drive shaft for meshing engagement with the gear teeth, a steering post, and means operatively connecting the steering post with the shaft in the hollow axle for driving the same, said last mentioned means comprising a worm and worm wheel arrangement.

In testimony whereof I affix my signature.

WALTER L. LUECK.